Jan. 20, 1970 N. HOGLUND 3,490,430
APPARATUS FOR FORMING CONTOURS
Filed March 14, 1967 11 Sheets-Sheet 1

INVENTOR.
NILS HOGLUND
BY
William A. Zalesak
Attorney

Jan. 20, 1970    N. HOGLUND    3,490,430
APPARATUS FOR FORMING CONTOURS
Filed March 14, 1967    11 Sheets-Sheet 2

INVENTOR.
NILS HOGLUND
BY
William A. Balesak
Attorney

Jan. 20, 1970 N. HOGLUND 3,490,430
APPARATUS FOR FORMING CONTOURS
Filed March 14, 1967 11 Sheets-Sheet 3

INVENTOR.
NILS HOGLUND

INVENTOR.
NILS HOGLUND
BY William A. Balesak
Attorney

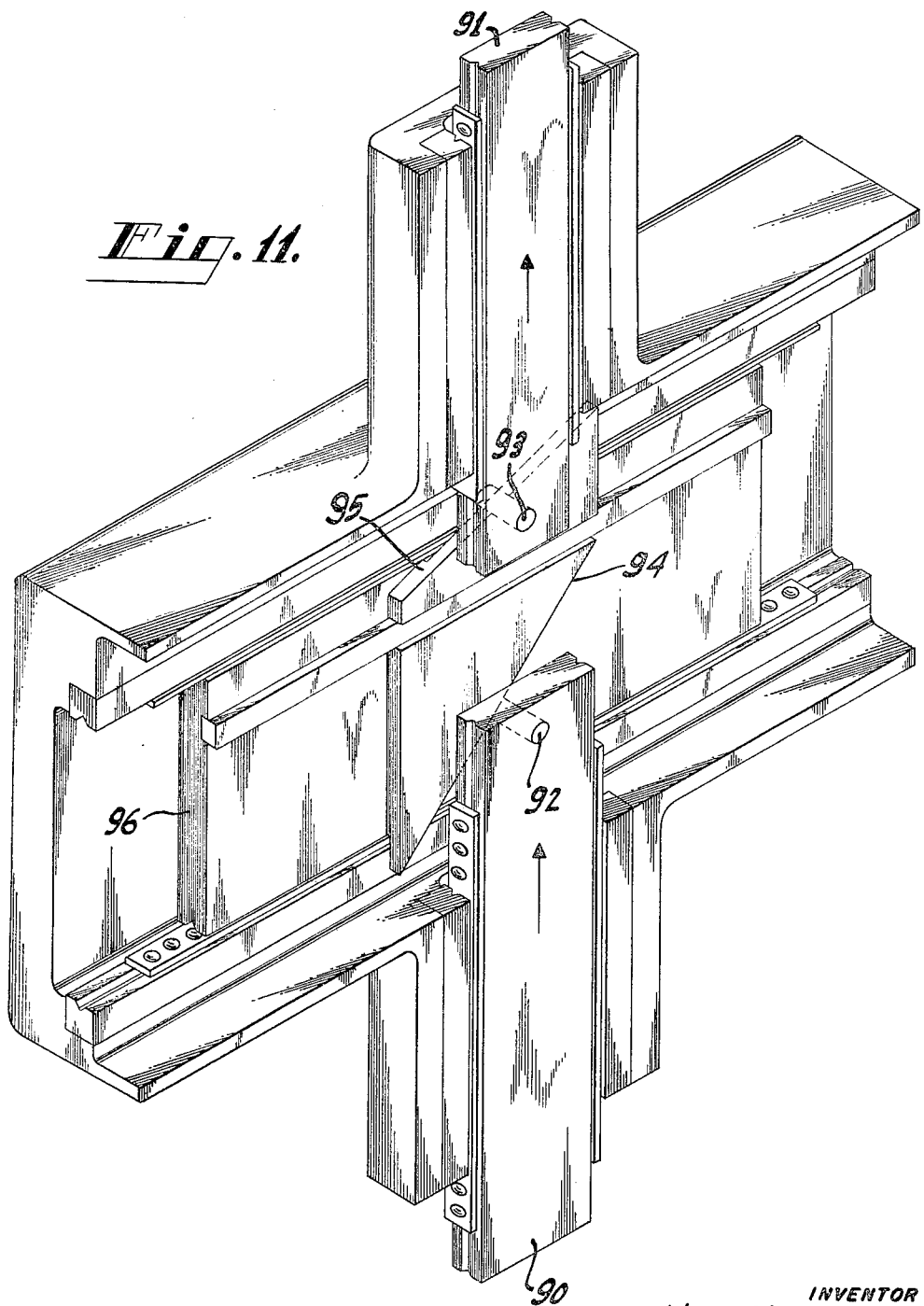

United States Patent Office 3,490,430
Patented Jan. 20, 1970

3,490,430
APPARATUS FOR FORMING CONTOURS
Nils Hoglund, Short Hills, N.J., assignor to Hoglund Engineering and Manufacturing Company, Inc., Berkeley Heights, N.J.
Filed Mar. 14, 1967, Ser. No. 623,102
Int. Cl. B24b 53/08
U.S. Cl. 125—11                              4 Claims

ABSTRACT OF THE DISCLOSURE

The apparatus, intended primarily for forming contours on or dressing the surfaces of grinding wheels, includes a two-way adjustable supporting base having an elongated slide guide on which a housing is slidably supported. Slidably mounted in the housing is a main slide carrying on one side thereof a removably mounted feed cam and a contour cam both elongated. A transfer slide has a cam attached thereto engaged by a follower fixed to the elongated slide guide on the base. A follower on the transfer cam engages the feed cam and causes movement of the housing. A tool slide is mounted on the housing. A plurality of other slides with contacting cams and followers are mounted between the contour cam and tool slide for causing movement of the tool slide. One of these plurality of other slides has a follower engaging the contour cam. Another of the plurality of slides provides a straight line motion between the tool slide and one of the plurality of other slides.

BACKGROUND OF THE INVENTION

Previous wheel dressers of the prior art had the contour cam mounted on top of the main slide and the so-called feed cam mounted on the bottom of the slide. Originally, this was no problem as the feed cam usually was a straight incline plane and was not required to be changed when the contour cam on the dresser was changed. With the more sophisticated forms of contours to be formed and the high precision required, it was necessary to go to timed cams. Timed cams consist of profiles on the feed cam as well as on the contour cam and, therefore, required constant changing of the feed cam as well as the contour cam.

One of the main problems caused by this double cam change was that the cam slide had to be removed from the dresser to allow mounting the feed cam on the rear of the cam slide. In many of the larger plants, the union contracts forbid the operator of the machine to remove any structure parts of equipment and as prior dressers had both electrical and hydraulic components attached to the cam slide, it was necessary, to satisfy the unions, to call in an electrician, hydraulic repair man and a machine repair man. This made it necessary for the machine to stand idle for hours waiting for these several men to be present simultaneously. A very strong demand arose to produce a piece of equipment where the operator could remove and exchange both the feed cam and the contour cam without the assistance of three or four other men.

Another requirement that has been presented by some of the manufacturers of transmissions for helicopters is to close down on the tolerance band on the involute to ±.000025 inch. Some of the design features required to produce this closer tolerance is a more rigid frame work, longer engagement of slides and elimination of compression springs for biasing purposes.

SUMMARY OF THE INVENTION

The apparatus intended primarily for forming contours on grinding wheels and for dressing grinding wheel surfaces, includes a base support and a base slide permitting linear adjustment. The base slide supports a vertically adjustable slide having an elongated slide guide slidably supporting a housing. Within the housing is a main slide having on one surface an elongated feed cam and an elongated contour cam. A transfer slide within the housing has a cam on one side engaging a follower fixed to the vertically adjustable slide and a follower engaging the feed cam. A vertically movable tool slide on the housing supports the cutting tools. A vertically movable contour or actuating slide has a follower thereon engaging the contour cam. A ratio cam is mounted on the actuating slide. A transfer slide for transferring straight line motion from the contour follower slide to the tool slide is mounted between the last two slides. Cams and followers on the contour follower slide, the tool slide and transfer slide causes the tool slide to have straight line parallel motion with respect to the contour follower slide. The cams on some of the slides may be ratio cams. Biasing means maintain all cams and followers in contact.

By removably mounting the feed and contour cams on one side, the so-called front side of the main slide, they may be easily replaced without dismantling the entire apparatus. In addition, by utilizing a transfer mechanism between the tool slide and the contour follower slide, straight line motion with any degree of ratio relationship is made possible.

The structure described provides a more rigid frame support for the housing, longer engagement of slides and elimination of compression spring providing extremely accurate forming and dressing to tolerances of ±.000025 inch.

BRIEF DESCRIPTION OF THE DRAWINGS

The invention will be described in connection with the accompanying drawings showing one embodiment of my invention;

FIGURE 11 is a perspective of a modification of the straight line, transfer slide mechanism shown in FIGURE 9.

Description of the preferred embodiments

Figure 1:
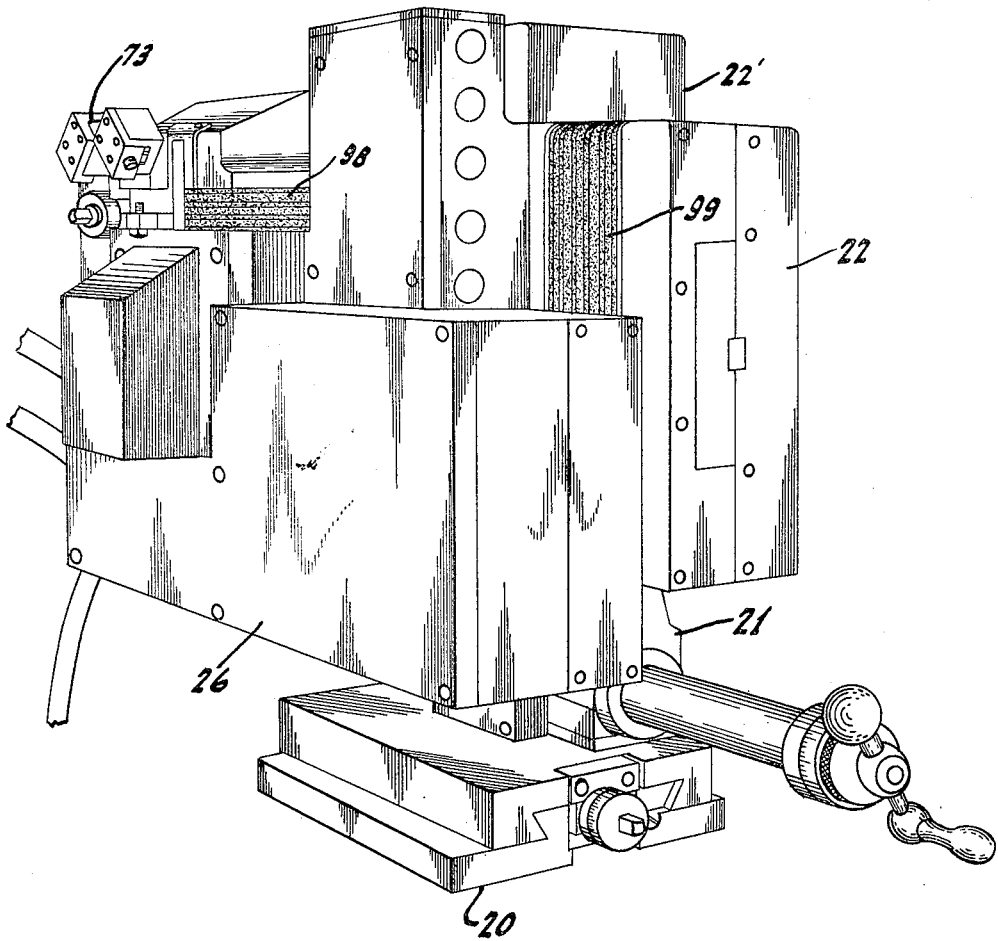
FIGURE 1 is a front perspective of apparatus incorporating my invention.
Figure 2:
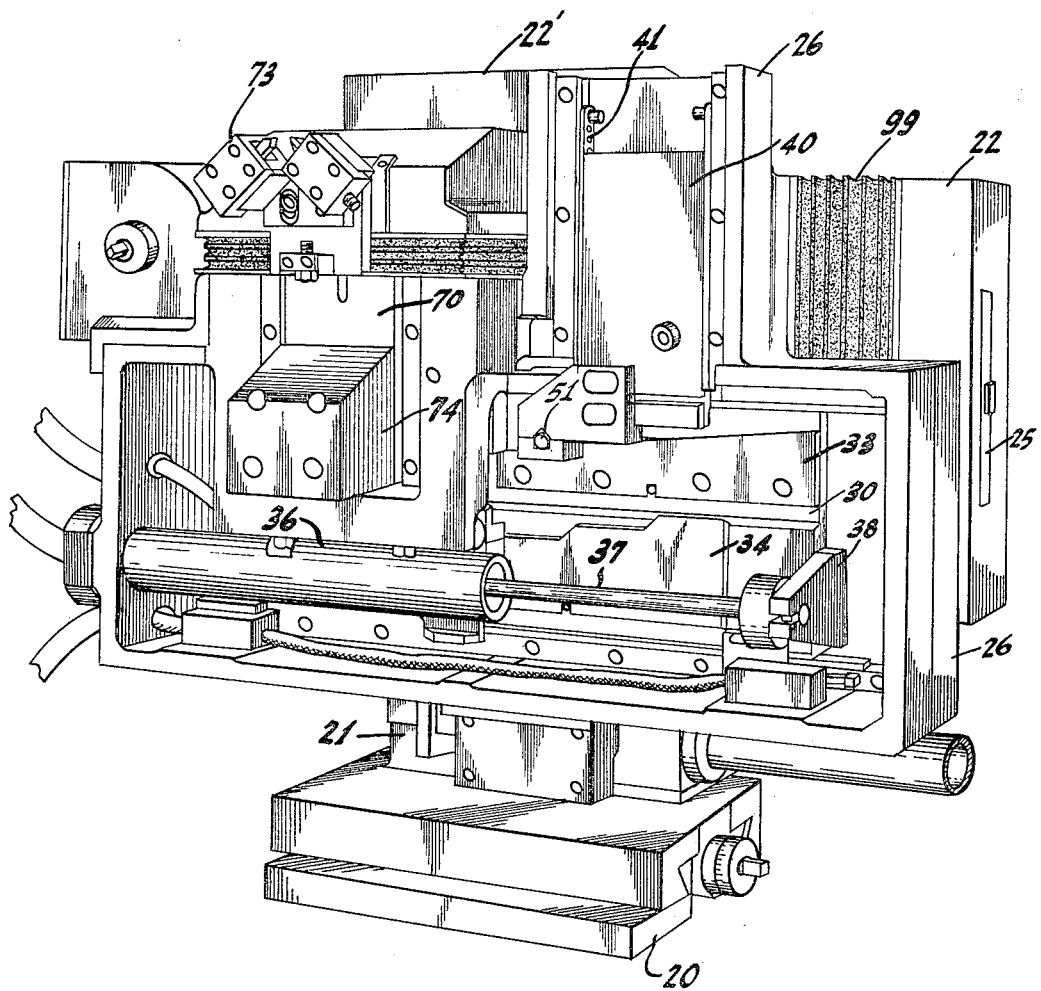
FIGURE 2 is a front perspective of the apparatus shown in FIGURE 1 with covers removed to show details of construction.
Figure 3:
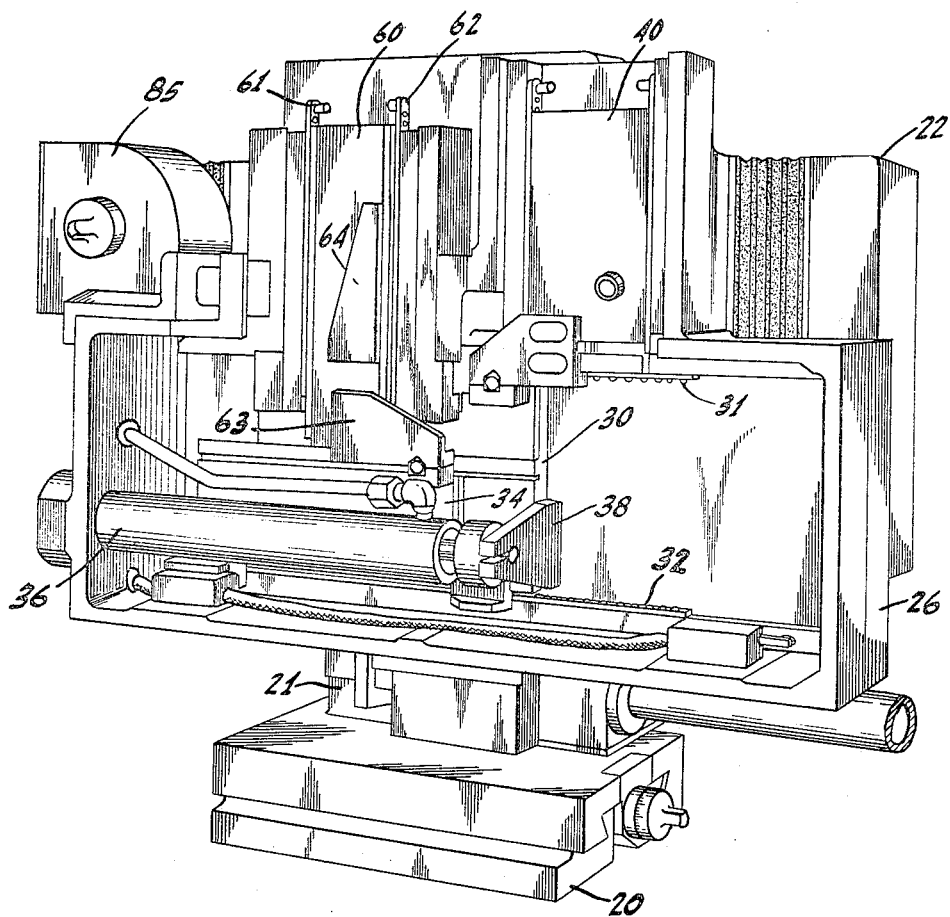
FIGURE 3 is similar to FIGURE 2 but with further elements removed to show further details of construction.
Figure 6:
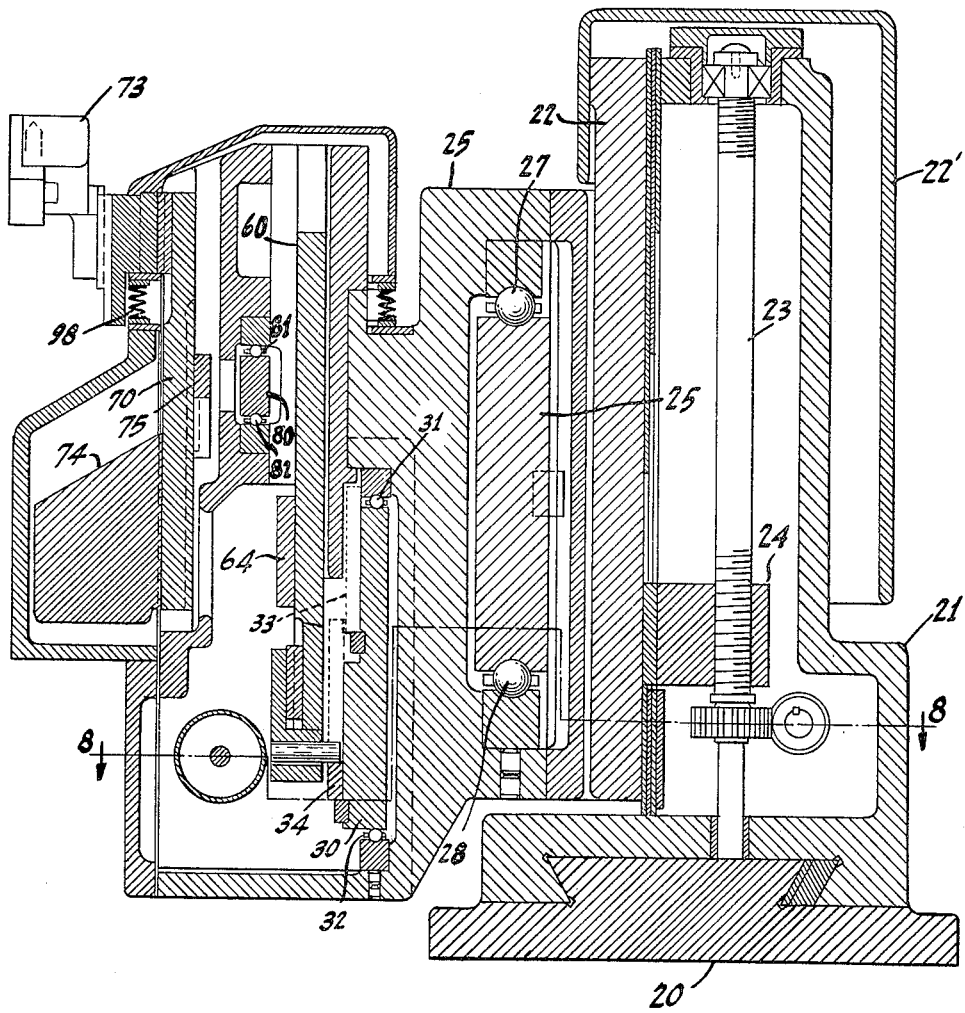
FIGURE 6 is a section taken along the line 6—6 of FIGURE 4.

Referring to the drawings (FIGURES 2 and 6), one form of apparatus made according to my invention includes a base 20 on which is slidably mounted the slide support 21. An elevating slide 22 having a cover 22' is mounted on slide support 21 and can be moved vertically by screw 23 engaging nut 24 secured to slide 22. The slide 22 is raised and lowered by the crank, shaft and worm wheel meshing with gear 23'. The elevating slide is provided with an elongated main supporting slide guide 25 fixed at its ends to the elevating slide 22. The main housing 26 is slidably supported on the slide guide 25 by bearing assemblies 27 and 28. The long slide support and no overhanging bearing assemblies insures rigid support of the housing and promotes extreme accuracy of movement.

All of the slides, cams and followers for causing movement of the housing and the cutting tools except the follower block controlling movement of the housing are mounted within the housing.

Mounted within the housing is a main slide on which are removably supported on one side thereof a feed cam for controlling movement of the housing and a contour cam for controlling movement of the cutting tools. A tool slide is mounted on the housing and moves transversely of the housing movement. Transfer slides and cams and associated followers are positioned between and are in contact with the feed and contour cams. The tool slide is weighted and tensioning devices are utilized to bias the above elements against each other.

Main slide mechanism

A main slide 30 (FIGURES 4, 6 and 7) is slidably supported in ball bearing assemblies 31 and 32. Mounted on one side thereof are the feed cam 33 and the contour cam 34. The feed cam 33 and contour cam 34 may be easily replaced by other shaped feed cams and contour cams from the front of the apparatus by removing the front cover 35 of the housing 26.

The slide 30 is moved back and forth by the hydraulically operated cylinder 36 secured at one end to the housing 26 and having a piston rod 37 secured to the slide 30 by means of the block 38 fixed to the main slide 30.

As will be described below, movement of the main slide 30 causes movement of the housing 26 and the tool slide to be described.

Feed cam transfer mechanism

To cause the housing, referring particularly to FIGURES 2, 4, 5 and 7, to move along slide guide 25, I provide a transfer slide 40 slidably mounted on the ball bearing assemblies 41 and 42 for vertical movement transversely of the movement of the housing 26. Mounted on one side of the transfer slide 30 is the transfer or ratio cam 43. A cam follower block 44 having a follower 45 is fixed to the slide support 25. The housing and the transfer cam are biased against follower 45 (FIGURE 8) by means of the biasing spring 46 mounted on slide 22 and having one end of the cable 47 fastened to the housing 26 at 48, the line being guided around the small pulley 49.

Fixed to the other side of the slide 40 is the follower 51. This follower is in contact with the feed cam 33. Thus, as the main slide is moved to the left (FIGURES 2 and 4) by piston 36, the slide 40 is moved upwardly. Since the follower 45 is fixed and since the cam section becomes greater in cross section as it is moved upwardly, the housing 26 is forced to the right. The reverse of course is also true.

Contour cam transfer mechanism

Figure 4:
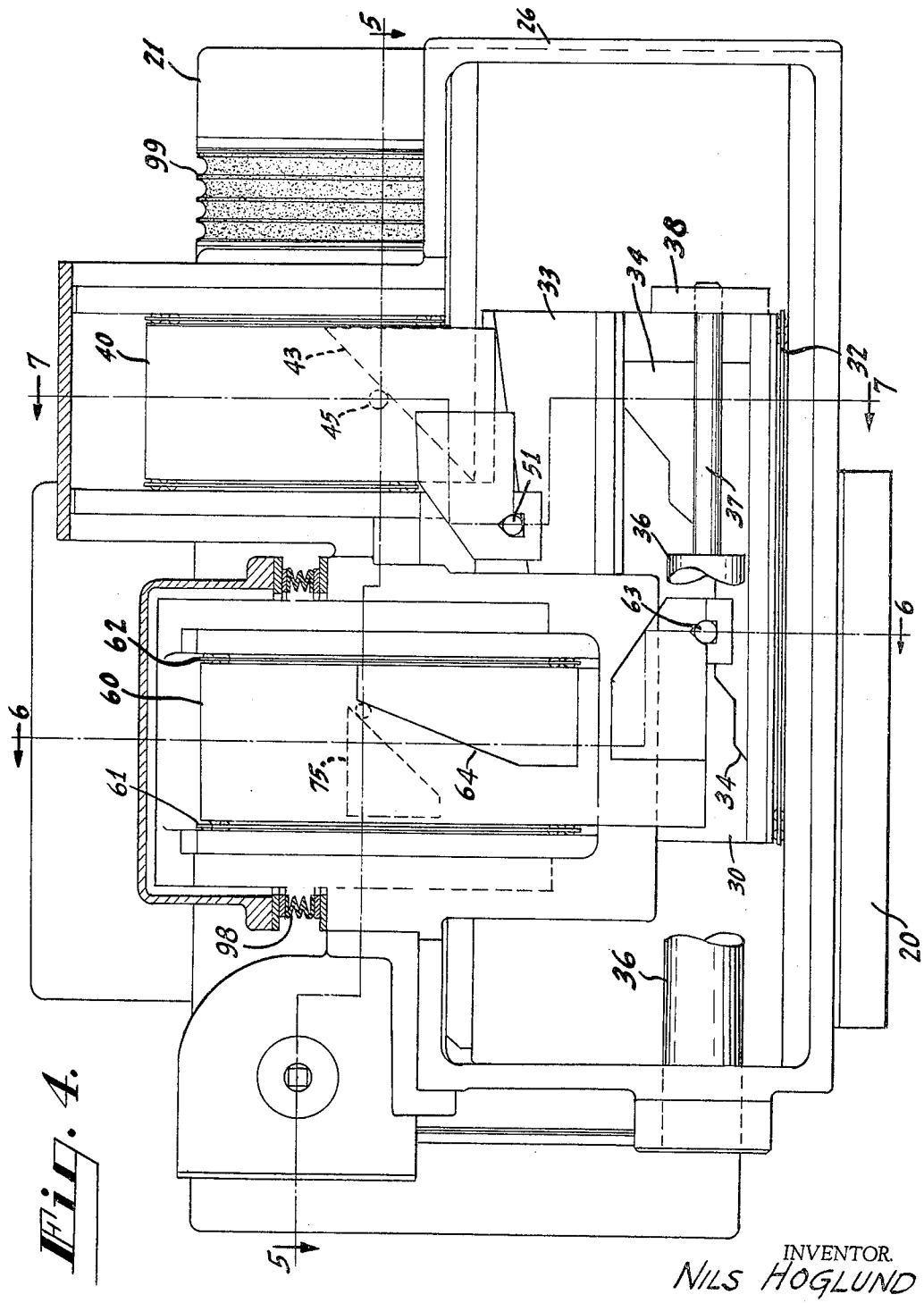
FIGURE 4 is a front elevation with parts removed to show details of construction.
Figure 5:
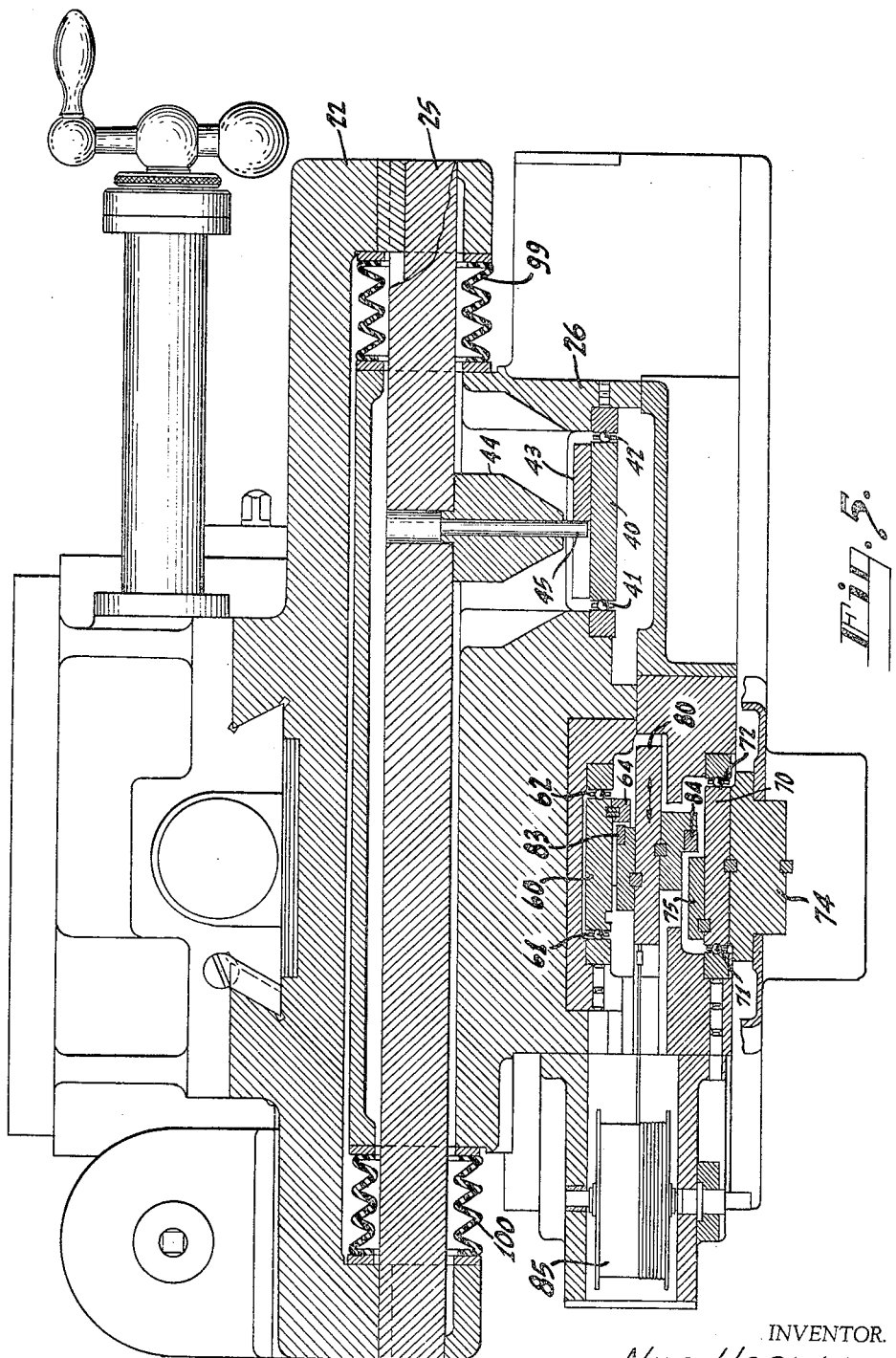
FIGURE 5 is a section taken along the line 5—5 of FIGURE 4.
Figure 7:
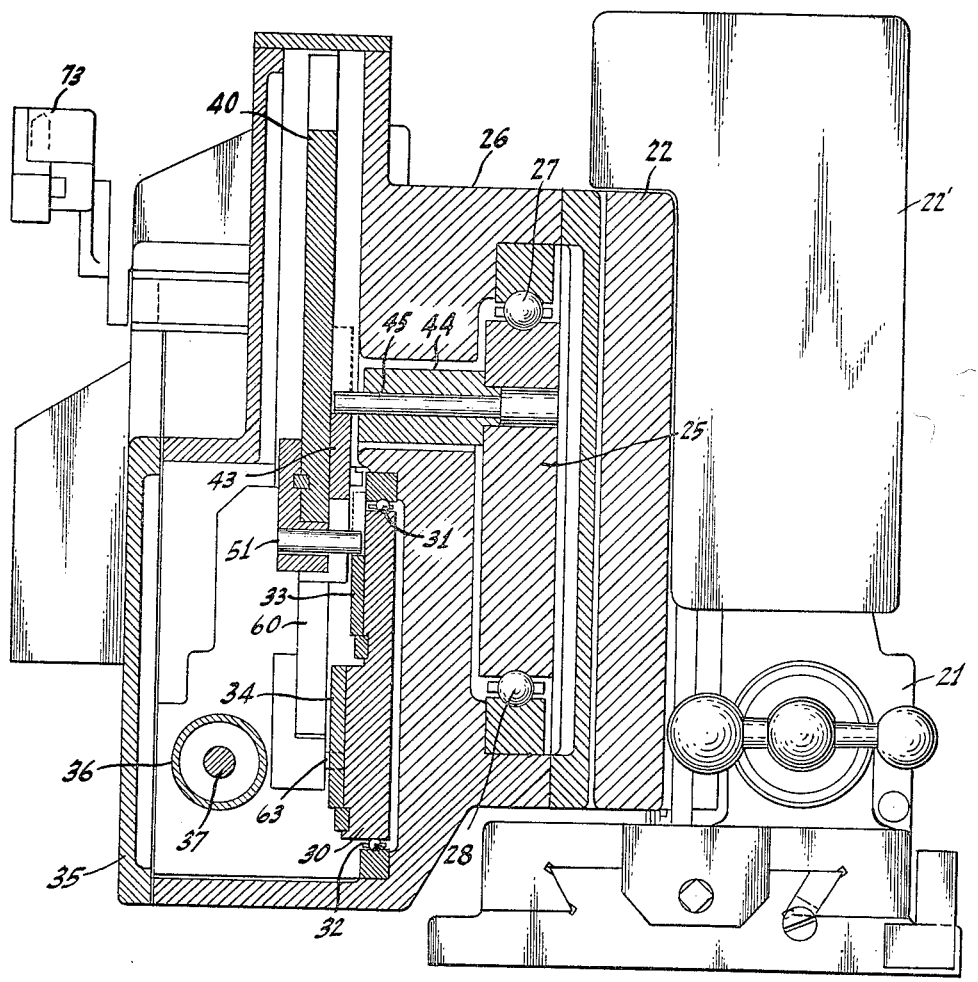
FIGURE 7 is a section taken along the line 7—7 of FIGURE 4.
Figure 8:
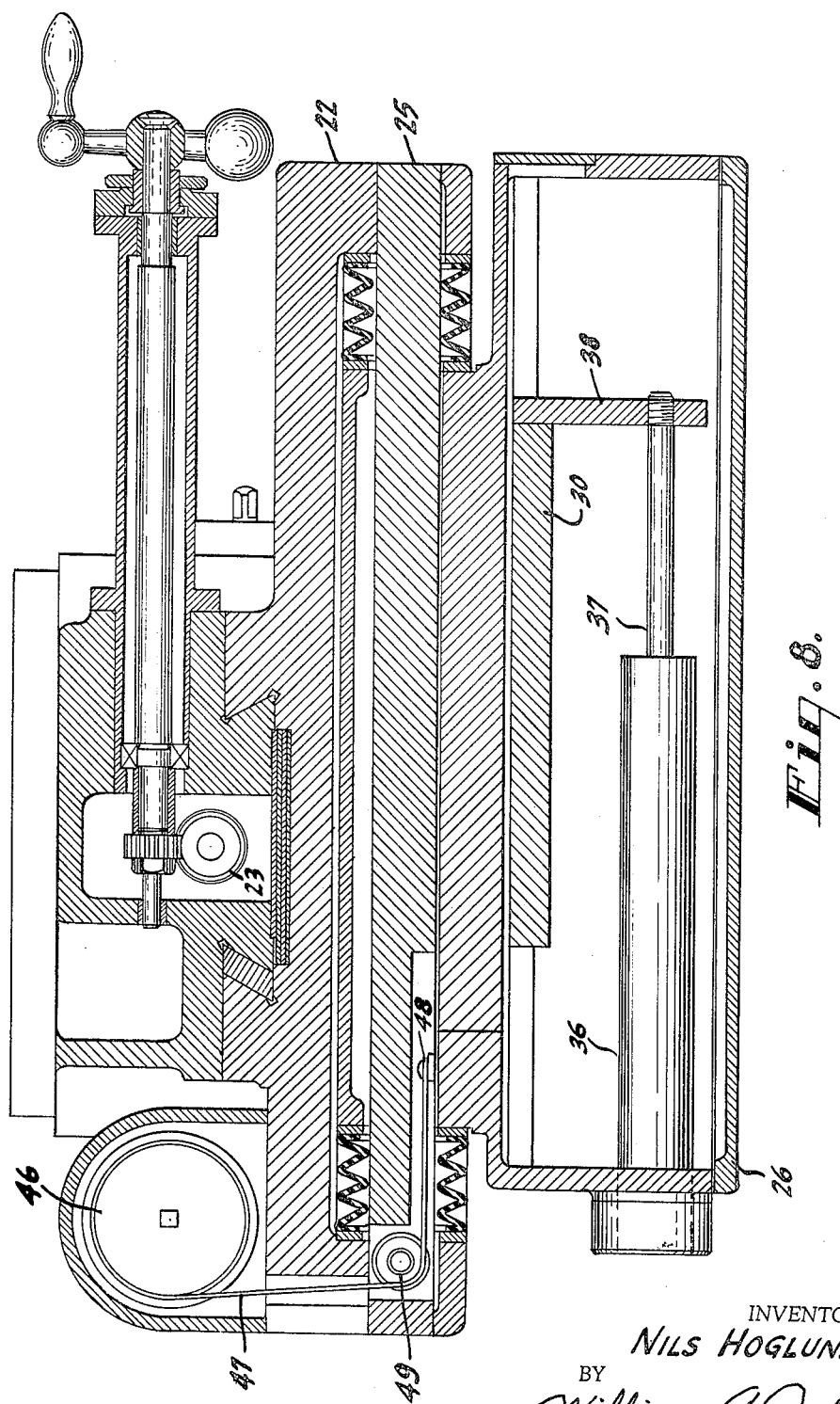
FIGURE 8 is a section taken along the line 8—8 of FIGURE 6.

Referring to FIGURES 4, 5 and 7, mounted in the housing 26 is a contour cam follower slide 60 mounted in ball bearing retainers 61 and 62 for vertical movement. Mounted at the lower end of slide 60 is the contour cam follower 63 in contact with contour cam 34. A ratio cam 64 is also fixed to the slide 60.

Slidably mounted on the housing 26 (FIGURES 2, 5 and 6) is the tool slide 70 mounted in the ball bearing assemblies 71 and 72. The double diamond cutting tool 73 is mounted at the upper end of the slide 70. A weight 74 provides one of the biasing forces to maintain cams and followers in contact. A ratio cam 75 is also mounted on the tool slide 70.

Figure 9:
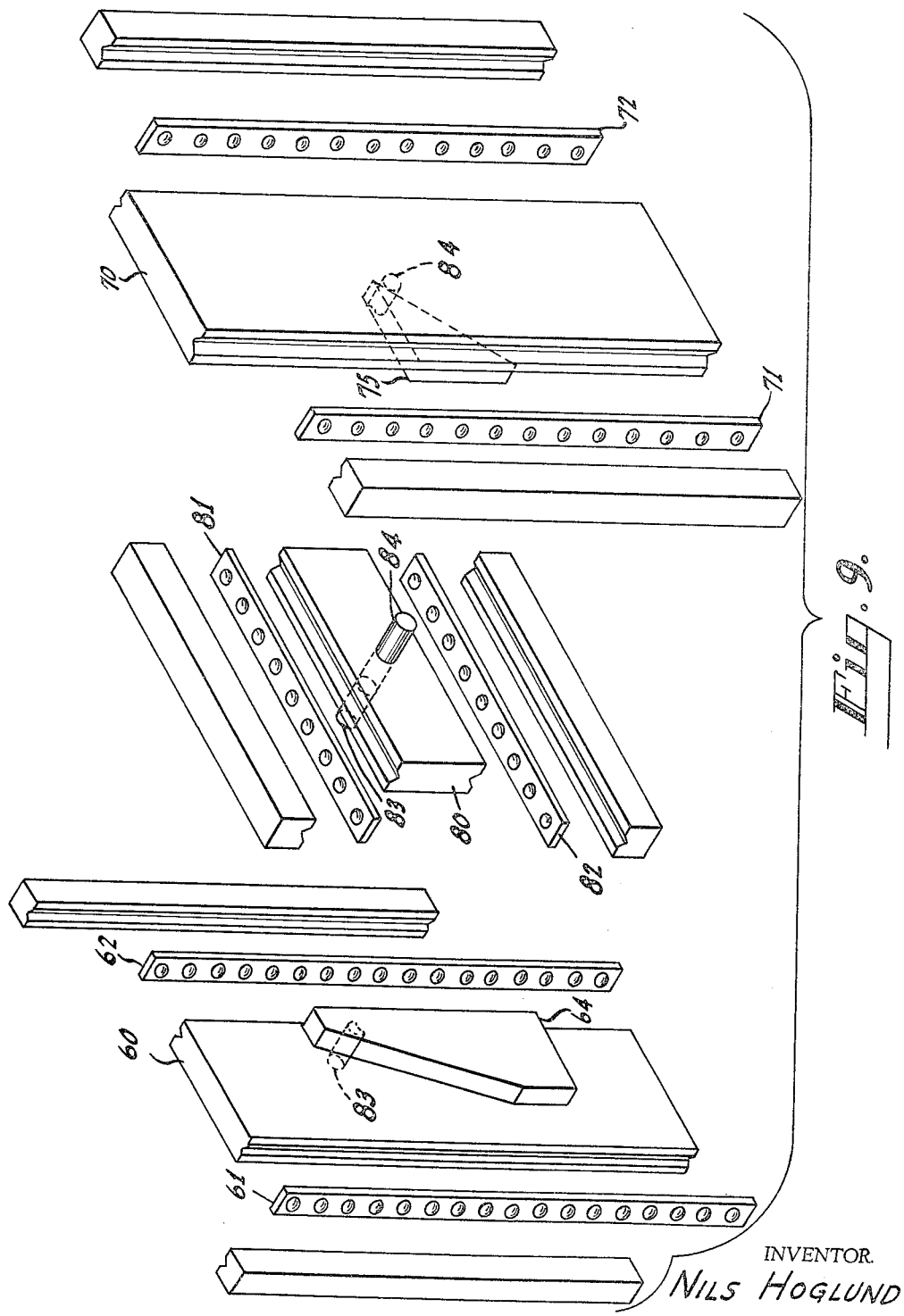
FIGURE 9 is an exploded perspective of the novel straight line slide transfer mechanism used in my apparatus.
Figure 10:
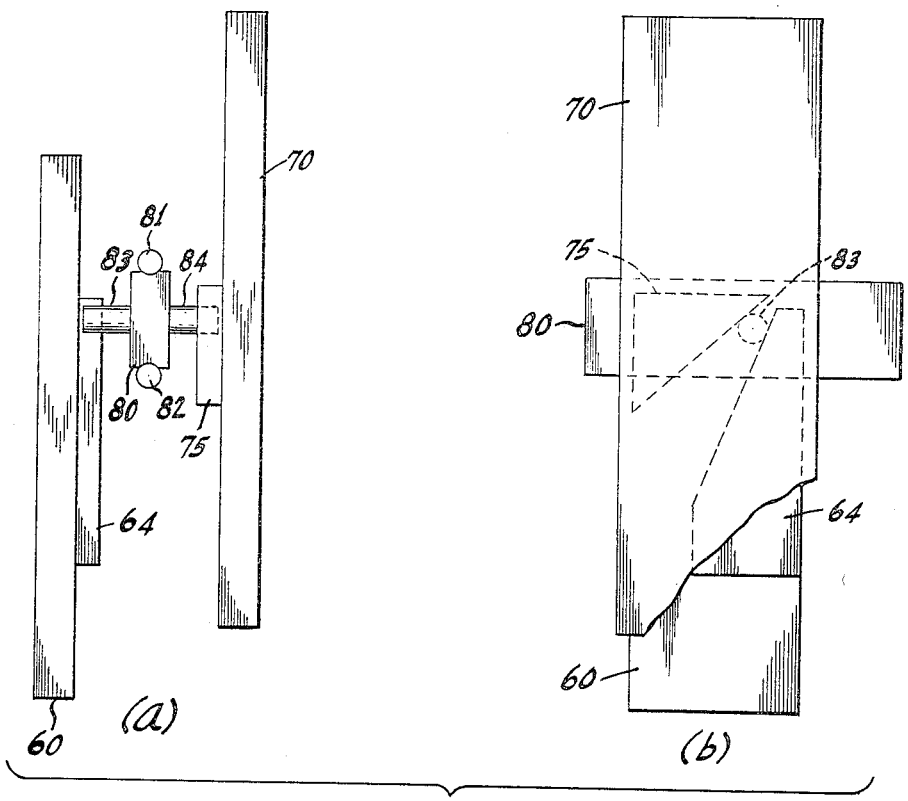
FIGURES 10a and 10b show schematically the end and side elevations of the assembly shown in FIGURE 9.

One of the novel features for transferring motion of the contour cam follower slide or actuating slide to the tool or resultant slide includes a transfer slide 80. This slide is supported by ball bearing assemblies 81 and 82. In the particular form shown (see FIGURES 5, 6 and 9) the transfer slide is provided with a follower block 83 in contact with cam 64 and another follower block 84 in contact with cam 75. A biasing spring 85 has a cable 86 attached to the slide 80 to maintain follower 84 in contact with cam 75.

As slide 60 moves upwardly follower 83 in contact with cam 64 causes transfer slide 80 to move to the left. Follower 84 in contact with cam 75 causes slide 70 to move upwardly in a plane parallel to the plane of movement of slide 60 linearly thereof. The relative degree of movement of the slides with respect to each other is determined by the slope on the cams 64 and 75.

Flexible dust shields are provided at 98, 99 and 100.

In a modification of the contour cam transfer mechanism which is not limited to use in the present apparatus, but can be used where straight line transfer between slides is desired (FIGURE 11). The actuating slide 90 and resultant slide 91 each have a follower 92 and 93. The transfer cam 94 and ratio cam 95 are here both mounted on the transfer slide 96. It will be noted that in this modification that the actuating slide 90 and resultant slide 91 lie in the same plane, thus reducing space required for the mechanism.

Overall operation

As pointed out above, the hydraulically operated piston 37 which is automatically controlled by electrical circuits not shown or described is moved back and forth within housing 26 to which the cylinder 36 is fixed.

Assuming that the main slide 30 is at its right limit of movement (FIGURES 2 and 4), if the slide is moved to the left by piston 37, the slide 40 is moved upwardly as follower 51 rides up on the feed cam 33. Since the follower 45 is fixed to the elongated slide guide 25, and since the cam section of cam 43 becomes greater in cross section as it moves upwardly, the housing 26 is forced to the right. The reverse action takes place when the main slide moves to the right. This causes the housing 26 and tool 73 to move axially across the wheel being dressed.

To provide the desired contour on the grinding wheel, the tool 73 must be made to travel the proper path across the grinding wheel. As described above as the main slide moves from right to left, the follower 63 on slide 60 rides on the contour cam 34, causing slide 60 to move upwardly. This action is transferred to tool slide 70 through the transfer slide 80 as described above.

What is claimed is:
1. Apparatus for forming contours including:
   (a) a base,
   (b) an elongated slide support fixed at its ends to said base,
   (c) a housing slidably mounted on said slide support,
   (d) a main slide on said slide housing and having on one face thereof,
   (e) a feed cam and a contour cam,
   (f) a first slide,
   (g) a follower mounted on said first slide,
   (h) a cam and follower means on said first slide and said elongated slide support engaging each other,
   (i) a tool slide mounted on said housing,
   (j) a second slide on said housing having a follower contacting said contour cam,
   (k) a third slide intermediate said second slide and said tool slide, said second slide, said tool slide and said third slide having cooperating cam and follower means for transmitting motion from said contour cam to said tool slide.

2. Apparatus for forming contours including:
   (a) a base,
   (b) an elevating slide support on said base,
   (c) an elongated slide support fixed at its ends to said elevating slide support,
   (d) a housing slidably mounted on slide support, (e) a main slide on said slide housing and having on one face thereof,
(f) a feed cam and a contour cam,
(g) a first slide having a first cam mounted on one side thereof,
(h) a follower mounted on the other side of said first slide,
(i) a fixed follower on said elongated slide support engaging said first cam,
(j) a tool slide mounted on said housing and movable parallel to said first slide,
(k) a second slide on said housing movable parallel to said first slide and having,
(l) a cam and a follower contacting said contour cam,
(m) said tool slide having a cam thereon,
(n) a third slide intermediate said second slide and said tool slide and having,
(o) follower means contacting the cams on said second slide and said tool slide.

3. Apparatus for forming contours including:
(a) a base,
(b) an elongated slide support fixed at its ends to said base,
(c) a housing slidably mounted on said slide support,
(d) a main slide on said slide housing and having on one face thereof,
(e) an elongated feed cam and a contour cam,
(f) a first slide having a cam mounted on one side thereof,
(g) a follower mounted on the other side of said first slide and engaging said feed cam,
(h) a fixed follower on said elongated slide support engaging the cam on said first slide,
(i) a tool slide mounted on said housing,
(j) a second slide on said housing having,
(k) a cam and a follower contacting said contour cam,
(l) a third slide intermediate said second slide and said tool slide, said second slide, said tool slide and said third slide having cooperating cam and follower means for transmitting motion from said contour cam to said tool slide.

4. Apparatus for forming contours including:
(a) a base,
(b) an elongated slide support fixed at its ends to said base,
(c) a housing slidably mounted on said support for movement in one direction,
(d) a main slide on said housing and having on one face thereof,
(e) an elongated feed cam and a contour cam,
(f) a first slide having a cam mounted on one side thereof and movable transversely of said housing,
(g) a follower mounted on the other side of said first slide and engaging said feed cam,
(h) a fixed follower on said elongated slide support engaging the cam on said first slide,
(i) a tool slide mounted on said housing and movable parallel to said first slide,
(j) a second slide on said housing movable parallel to said first slide and having,
(k) a cam and a follower contacting said contour cam,
(l) a third slide intermediate said second slide and said tool slide,
said second slide, said tool slide and said third slide having cooperating cam and follower means for transmitting motion from said contour cam to said tool slide.

References Cited
UNITED STATES PATENTS

| | | | |
|---|---|---|---|
| 2,904,029 | 9/1959 | Hoglund | 125—11 |
| 2,936,750 | 5/1960 | Hoglund | 125—11 |
| 2,973,755 | 3/1961 | Hoglund | 125—11 |
| 3,151,606 | 10/1964 | Hoglund | 125—11 |

HAROLD D. WHITEHEAD, Primary Examiner